United States Patent
Bradski

(10) Patent No.: US 7,644,049 B2
(45) Date of Patent: Jan. 5, 2010

(54) DECISION FOREST BASED CLASSIFIER FOR DETERMINING PREDICTIVE IMPORTANCE IN REAL-TIME DATA ANALYSIS

(75) Inventor: Gary R. Bradski, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 10/993,651

(22) Filed: Nov. 19, 2004

(65) Prior Publication Data

US 2006/0179019 A1 Aug. 10, 2006

(51) Int. Cl.
*G06F 15/18* (2006.01)
*G06E 1/00* (2006.01)
(52) U.S. Cl. .............................. 706/12; 706/20; 706/21
(58) Field of Classification Search ................... 706/15, 706/20, 21, 12; 700/44, 48
See application file for complete search history.

(56) References Cited

U.S. PATENT DOCUMENTS

| | | | | |
|---|---|---|---|---|
| 6,317,731 B1* | 11/2001 | Luciano | ........................ | 706/21 |
| 6,546,389 B1* | 4/2003 | Agrawal et al. | ................ | 707/6 |
| 6,694,303 B1* | 2/2004 | Agrawal et al. | ............... | 706/52 |
| 6,900,762 B2* | 5/2005 | Andrews et al. | ............ | 342/463 |
| 6,931,403 B1* | 8/2005 | Agrawal et al. | ................ | 707/10 |
| 2004/0002930 A1* | 1/2004 | Oliver et al. | ................... | 706/46 |
| 2004/0072143 A1* | 4/2004 | Timmis et al. | .................. | 435/4 |
| 2004/0083084 A1* | 4/2004 | West | ........................... | 703/11 |
| 2004/0111314 A1* | 6/2004 | Cavaretta | ...................... | 705/10 |
| 2004/0172374 A1* | 9/2004 | Forman | ........................ | 706/12 |
| 2004/0181553 A1* | 9/2004 | Stockfisch | ............... | 707/104.1 |
| 2004/0224301 A1* | 11/2004 | Timmis et al. | ................. | 435/4 |

OTHER PUBLICATIONS

Du et al., Wenliang, "Building Decision Tree Classifer on Private Data", IEEE, 2002.*
Du et al., Wenliang, "Building Decision Tree Classifier on Private Data", IEEE, 2002.*
Heckerman et al., David, "Dependency Networks for Collaborative Filtering and Data Visualization", 16th Conference on Uncertainty, 2000.*
Karat et al., "Personalizing the user experience on ibm.com", 2003.*

* cited by examiner

*Primary Examiner*—David R Vincent
*Assistant Examiner*—Adrian L Kennedy
(74) *Attorney, Agent, or Firm*—Blakely, Sokoloff, Taylor & Zafman LLP

(57) ABSTRACT

For a first feature of a dataset having a plurality of features, training a classifier to predict the first feature in terms of other features in the data set to obtain a trained classifier; scrambling the values of a second feature in the data set to obtain a scrambled data set, executing the trained classifier on the scrambled data set, determining predictive importance of the seconds feature in predicting the first feature based at least in part on the accuracy of the trained classifier in predicting the first feature when executed with the scrambled data set and creating a graph of the data set in which each of the first and the second features is a node of the graph and a label on an edge between the first node and the second node is based at least in part on the predictive importance of the first feature in terms of the second feature.

17 Claims, 4 Drawing Sheets

DECISION FOREST BASED CLASSIFIER FOR DETERMINING PREDICTIVE IMPORTANCE IN REAL-TIME DATA ANALYSIS

BACKGROUND

A data set may be thought of as a collection of data elements or data points, each with a set of several features. A feature, in turn, may be thought of as a variable having a specific value for a specific data point. Thus, for example, a data set comprising car data may have a data point for each car model in current use, and each data point, corresponding to a particular car, may have features such as make, model, year, type, weight, fuel consumption, original price, color and engine capacity. For instance, a particular vehicle, the Runabout, manufactured by the CarCo company might have a data point with the following values for the listed feature set: (CarCo, Runabout, 1999, Minivan, 4900 lbs, 18 mpg, $23,000, navy blue, 3.0 liters).

A supervised data set is a data set in which each data point has been labeled with an identifying or a predictive label. Thus for the car data set, a label such as "family car" may be applied to cars with the feature type having a value Minivan, Sedan, or SUV; a label such as "fuel efficient" may be applied to cars with a fuel consumption value greater than 27 mpg. These labels are examples of identifying labels. Other labels may be numerical values, such as annual cost to insure, which may be turn out to depend primarily on, for example, on a car's type, weight, engine capacity, and year.

Machine learning is a field which, in a relevant aspect, includes trainable classifiers. A trainable classifier is in one instance a processor-based system that is trained using a supervised dataset; the same phrase may also be used to refer to a software program or programs that reside on storage in the processor based system or in a passive data storage medium and may be executed to operate the classifier. Once trained on a set of supervised data, a classifier may then predict a label for a new data point that is not in the dataset that was used for training. Thus, a classifier for car data that is trained on a data set with insurance costs as predictive labels may then be able to predict insurance costs for a car that is not in the training data set by being able to determine the closeness of the new data point corresponding to the new car to other data points on which the classifier has previously been trained. Thus, by determining a likely value for the label, the classifier is able to predict an insurance cost estimate for the car.

Trainable classifiers are known in the art and include tree-based and forest-based classifiers. A well known tree-based classifier is the Classification and Regression Tree (CART), from Breiman L., *Classification and regression trees*. (Wadsworth, 1984), based on a binary decision tree. A well known forest-based classifier is one based on a regression forest of trees, such as MART, described in *Elements of Statistical Learning*, by Hastie, Tibshirani and Friedman (Springer-Verlag, 2001). Many other classifiers are known in the art.

Dependency networks consist of a data set where the dependency of each feature on all the others is measured and sometimes visualized. Dependency networks are used as "collaborative filtering" networks and may be applied, as is known in the art, in such applications as predicting which book a customer may buy, given the books that the customer has purchased previously from a vendor and the dependencies those books had for previous customers. Manufacturers have used dependency networks to detect multiple joint causes of failure in factory systems. Dependency networks are mostly derived from statistical decision trees (Hastie et al., supra) where the first several decision split variables are considered the main dependencies. As is known in the art, split variables generally are variables which separate the data into consistent classes most efficiently. Decision split variables are not very stable in regards to adding or subtracting data points to the data set from which the dependency network is derived.

DETAILED DESCRIPTION

Figure 1:
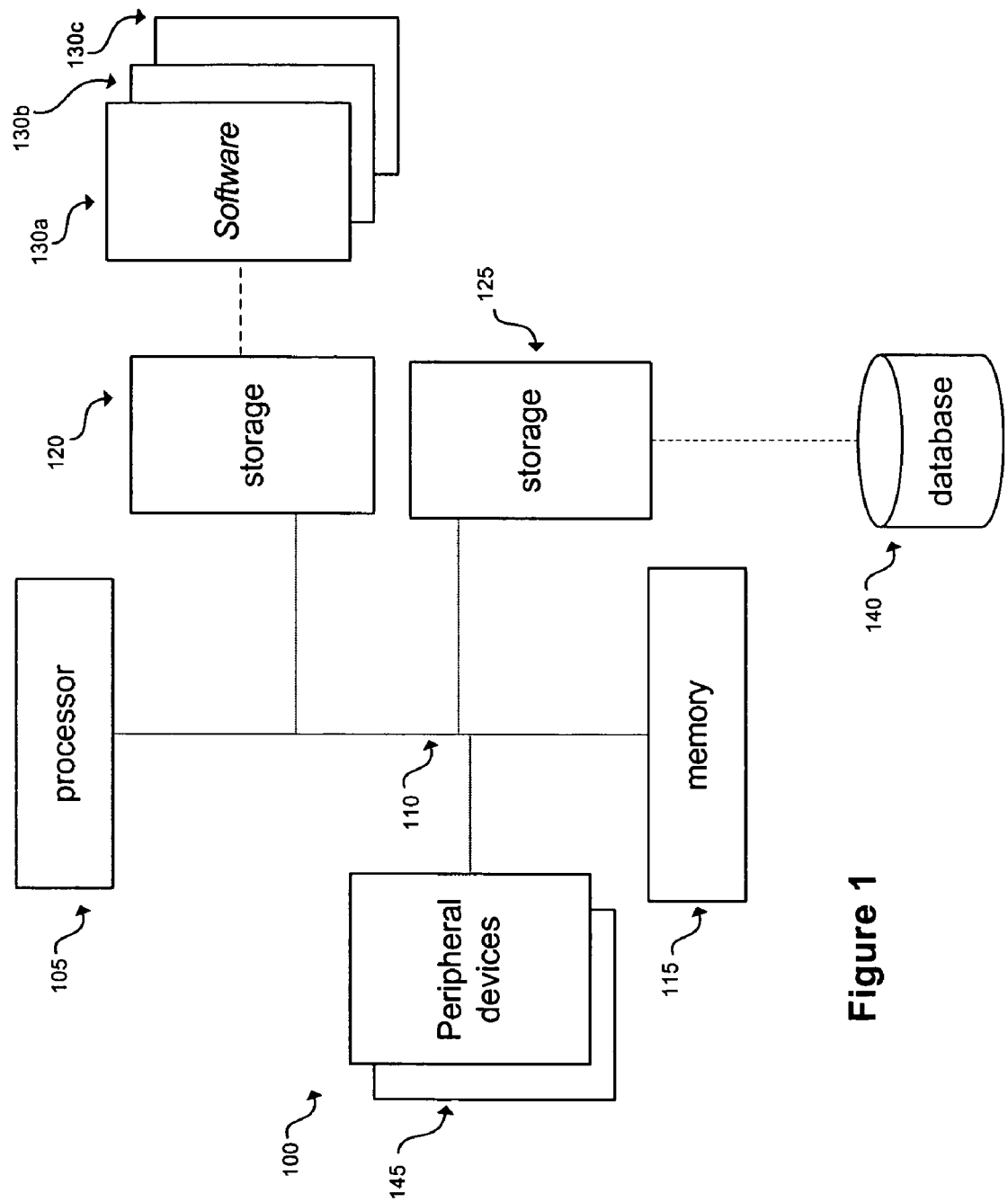
FIG. 1 depicts a processor based system in one embodiment.

Referring to FIG. 1, a processor based system 100 may include a processor 105 coupled to a bus 110. The system 100 is only an example and the present invention is not limited to any particular architecture. In a simple example, the bus 110 may be coupled to system memory 115, a storage 120, peripheral devices 145, and another storage 125. The storage 120 may store various software 130*a*, 130*b*, and 130*c*, including for instance classification software, and a predictive importance network generator. Data that may be used for the generation of importance networks by classification may be stored in a database 140 associated with the storage 125. The system may be connected to a variety of peripheral devices 145 via one or more bus systems. Such peripheral devices may include displays and printing systems among many others as is known.

Figure 2:
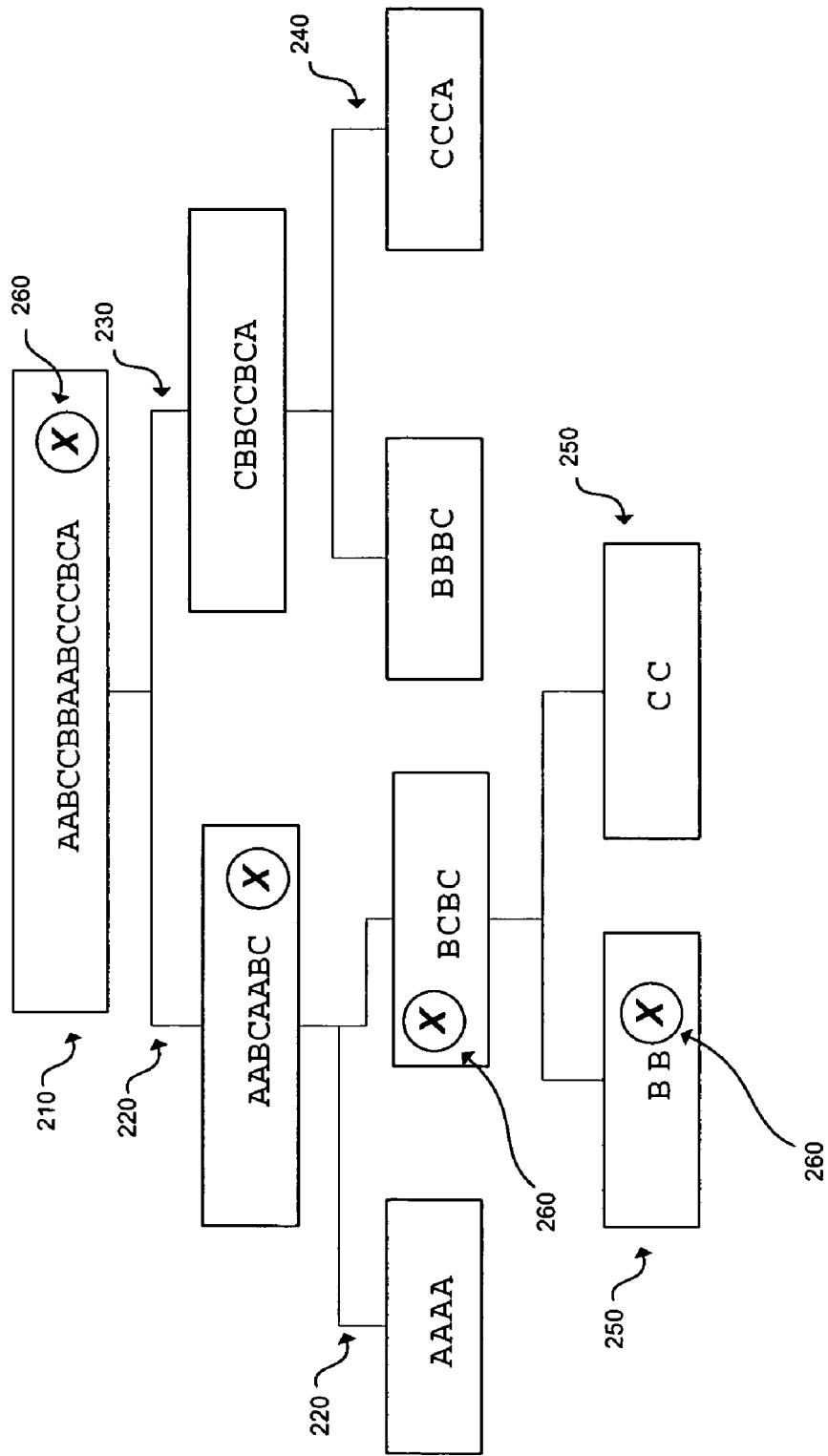
FIG. 2 depicts a tree-based classifier in action.

FIG. 2 depicts a high level visualization of a tree-based classifier in operation, specifically in the example depicted, being trained on a supervised data set. The illustrative root data set depicted in the example consists of the data elements represented by (AABCCBBAABCCCBCA), where in this example, data elements represented by "A" share a strong relationship in terms of the label or predictor for the data set, and are as a group distinct from those elements represented by "B" which also share a different strong relationship with respect to the label or predictor. Thus, for one example, the elements represented by a label "A" in a supervised car data set like the one described above, with a predictor for insurance rates, might be low insurance rate cars; the elements B might be cars with average insurance rates; and the elements represented by "C" might be cars with high insurance rates.

During a training process, the root dataset 210 may be progressively classified into branches using a decision criterion. At each decision or branching point, the decision criterion is applied. The most common decision criterion is to find a function of the features that best separates the data into like groups, each group of which is then assigned to follow its corresponding branch at that point. The tree-based classifier enables one to select or distinguish between data. For example, some data may have features that may be more relevant or more pertinent than other data. The data's relevancy may be specified by a classifier that enables the data to be assessed.

Generally, a tree-based classifier may use multiple branches at each branching point. To be concrete, we discuss a binary decision tree below where there can only be two choices at each branch point: Follow the "left" branch or follow the "right" branch. By our convention, call the left branches 220 of the tree the "yes" branches and the right branches 230 of the tree the "no" branches. That is, data with features that meet the classification criteria are placed in the left branch and data that does not meet those criteria are placed in the right branch. The classification criteria (which is not shown in FIG. 2) are applied at the branching point between branches.

Thus, the initial dataset AABCCBBAABCCCBCA at the root 210 may be subjected to a tree-based classification. By our convention here, the repeats of the data points "A", "B" and "C" are meant to represent different data that share strong relationships with each other in their respective groups. The data (AABCAABC) that satisfies a first level set of decision criteria is put into the left branch 240, while the data (CBBC-CBCA) that does not satisfy the criteria is put into the right branch 260. This process is repeated recursively until relatively pure subgroups of the data such as 250 are generated.

Once a classifier such as that depicted in FIG. 2 is trained, the decision criteria made at each decision point in the classifier, in this example a binary tree, may then be applied to a new, unlabeled data point, represented by X at 260 in FIG. 2, that does not have a predictive value or label associated with it. When the new unlabeled data point is passed through the classifier, in this example a decision tree, it is filtered left or right as it descends through each level in the tree as shown in the figure until it reaches a leaf node 250. In the figure, the data point represented by X is predicted to have the characteristics most like those associated with the label or predictor "B" in the initial data set. In a real world analogy, a classifier trained with car data and associated insurance rate labels or predictors to predict insurance rates would be able to predict an insurance rate for a new car data point (analogous to X). Thus, a classifier like the one discussed above could predict whether, in the example used here, the new car corresponding to the data point would be likely to have a low, average, or high insurance rate (analogous to the labels A, B and C).

If the new data point X had a previously known value for the predictor, in this example a car insurance rate, the accuracy of the classifier on X could be measured as a binary value based on whether X was predicted by the classifier to have the correct predictor or label by comparing the predictor or label predicted by the classifier to the value known for the data point X. This method could be repeated for a large number of new data points in a set Dx and the error rate of the classifier on the set Dx could then be calculated as a fraction of the data points in Dx for which the classifier mis-predicted a known label or predictor value.

Many means for classifying supervised data including tree and forest-based methods among others are known in the art and have been mentioned above in the Background section of this application. Generally, all of these methods allow for the training of a classifier on a supervised data set and the subsequent use of the trained classifier on new unsupervised data.

In one embodiment a classifier is used to derive importance values for features of a data set. The data set may be a supervised data set or it may be unsupervised. A pseudo code version of this processing is depicted below:

1. For each feature $f_i$ in $f_1$ to $f_n$ of data set D
   a. Train a classifier $C_i$ using D to predict feature $f_i$
   b. for each feature $f_j$ in $f_1$ to $f_{i-1}$ and $f_{i+1}$ to $f_n$
     i. scramble feature $f_j$ in D to obtain data set $D_j$ -continued ii. pass $D_j$ through classifier $C_i$
     iii. Importance $I_{ij}$ of $f_j$ in predicting $f_i$ = error rate of $C_i$ in predicting $f_i$
   c. endfor
2. endfor A corresponding block diagram of the flow of processing in the embodiment is provided for further clarification as FIG. 3.

In the above processing, it is assumed that a data set D exists with a plurality of data points. Each data point in D has n features, f1, f2, f3 . . . fn. In this embodiment, the processing takes place for each pair of features (fi, fj) in D, where i and j are distinct, in the form of two nested loops as depicted above. First, in the processing at 1, (FIG. 3 at 310), the processing iterates through each feature fi, i between 1 and n, and at 1.a, for that feature fi, trains a classifier Ci to predict feature fi based on all the other features in the data set D, FIG. 3 at 320. In other words, feature fi is treated as a label or predictor on which the classifier is to be trained as described previously. In the processing at 1.b, the trained classifier is used to derive the importance of every other feature fj (j other than i) in predicting feature fi (shown in the block at 330 in the figure). This is done in a nested loop at 1.b.i-1.b.iii above, corresponding to blocks 340, 350 and 360 in the figure. At 1.b.i, the existing data set D is scrambled by remapping the values of the feature fj among the data points of D at random to obtain a new, scrambled data set Dj (at 340 in the figure). At 1.b.ii, each point of the scrambled data set Dj is then passed through the classifier Ci to determine to what extent the classifier fails to correctly predict the feature fi despite the scrambling of the feature fj, at 350 in the figure. The fraction of data points in Dj for which the classifier Ci fails to predict fi because of the scrambling of the feature fj, i.e. the error rate of the classifier Ci on the scrambled data set Dj is computed at 1.b.iii. This value, in this embodiment, is a metric of the predictive importance of feature fi in predicting feature fj, at 360 in the figure. The processing in 1.b is repeated for each feature other than fi and then the entire process is repeated with fi taking the value of each feature in D. At the end of the processing, the predictive importance of each feature fi in terms of every other feature fj, for data set D and for the classifiers of the type used in the processing, is known.

To better clarify the processing at 1.b.i (FIG. 3 at 340) a simple example is provided. An exemplary dataset D representing 7 cars consists of 7 data points, D1 through D7. Each of these data points has a value for each of 9 features, make, model, year, car type, weight, efficiency, price, color, and engine capacity, in that order. In this instance, the make, model, car type, and color are string-valued features; the remaining features, i.e. year, weight in lbs, efficiency in miles per gallon, price in US dollars and engine capacity in liters, are numeric variables. The data set is shown below:

("CarCo", "Runabout", 1999, "Minivan", 4900, 18, 23000, "navy blue", 3.0)

("AutoCorp", "Transpo", 2000, "Sedan", 2800, 24, 16000, "silver gray", 2.0)

("GoCars", "Vantage", 1998, "SUV", 5000, 17, 22000, "black", 3.0)

("AutoCorp", "Dasher", 2002, "Coupe", 2200, 17, 29000, "chrome yellow", 3.5)

("AutoCorp", "Veloce", 2003, "Sedan", 2700, 18, 23000, "red", 3.5)

("CarCo", "Maxim", 2002, "SUV", 5400, 14, 27000, "forest green", 4.5)

("GoCars", "Eco", 1999, "Coupe", 2200, 28, 23000, "aubergine", 1.7)

In executing the processing described above, if it is assumed, for the sake of illustration, that the feature fj is efficiency, then after scrambling, the new data set Dj may be as follows. Note that the efficiency feature "column" has been scrambled, that is, the values for efficiency have been remapped among the elements of the data set, as shown below:

("CarCo", "Runabout", 1999, "Minivan", 4900, 17, 23000, "navy blue", 3.0)
("AutoCorp", "Transpo", 2000, "Sedan", 2800, 18, 16000, "silver gray", 2.0)
("GoCars", "Vantage", 1998, "SUV", 5000, 17, 22000, "black", 3.0)
("AutoCorp", "Dasher", 2002, "Coupe", 2200, 28, 29000, "chrome yellow", 3.5)
("AutoCorp", "Veloce", 2003, "Sedan", 2700, 14, 23000, "red", 3.5)
("CarCo", "Maxim", 2002, "SUV", 5400, 24, 27000, "forest green", 4.5)
("GoCars", "Eco", 1999, "Coupe", 2200, 17, 23000, "aubergine", 1.7)

It should be noted that the above example is only one instance of a scrambling of a data set based on a single feature and is illustrative. Many other variations are possible, as are an unlimited number of possible data and feature choices for a particular application.

Further, as noted earlier, the data set selected for computation of predictive importance may or may not be supervised. If a data set is supervised, the label or predictor is treated as if it were just another label. That is, if a data set had n features f1-fn and a label l, the processing would treat this as if it were a data set with n+1 features, f1-fn, and l. The predictive importance of the label in terms of the other features may be computed in the same manner as previously described.

Many other means or steps for deriving the predictive importance of a feature in terms of other features are possible. First, different classifiers are known in the art and therefore the above described processing may vary in different embodiments depending on the actual classifier used in deriving the predictive importance of a feature. Second, it may only be necessary in some embodiments to derive the predictive importance of a few features and not of all features, in contrast to the above processing which derives the predictive importance of each feature in terms of all the others. Other numeric measures of a predictive importance measure may be used, depending on the data set D used in the processing above; for one example, in the embodiment described, the accuracy of classifier Ci on the scrambled data set Dj is derived as a simple ratio of misclassified data points to total data points; in other embodiments some misclassifications may carry more weight, for instance, and the ratio may therefore differ. Other error metrics that are more complex are known in the art and may be used in other embodiments.

Figure 3:
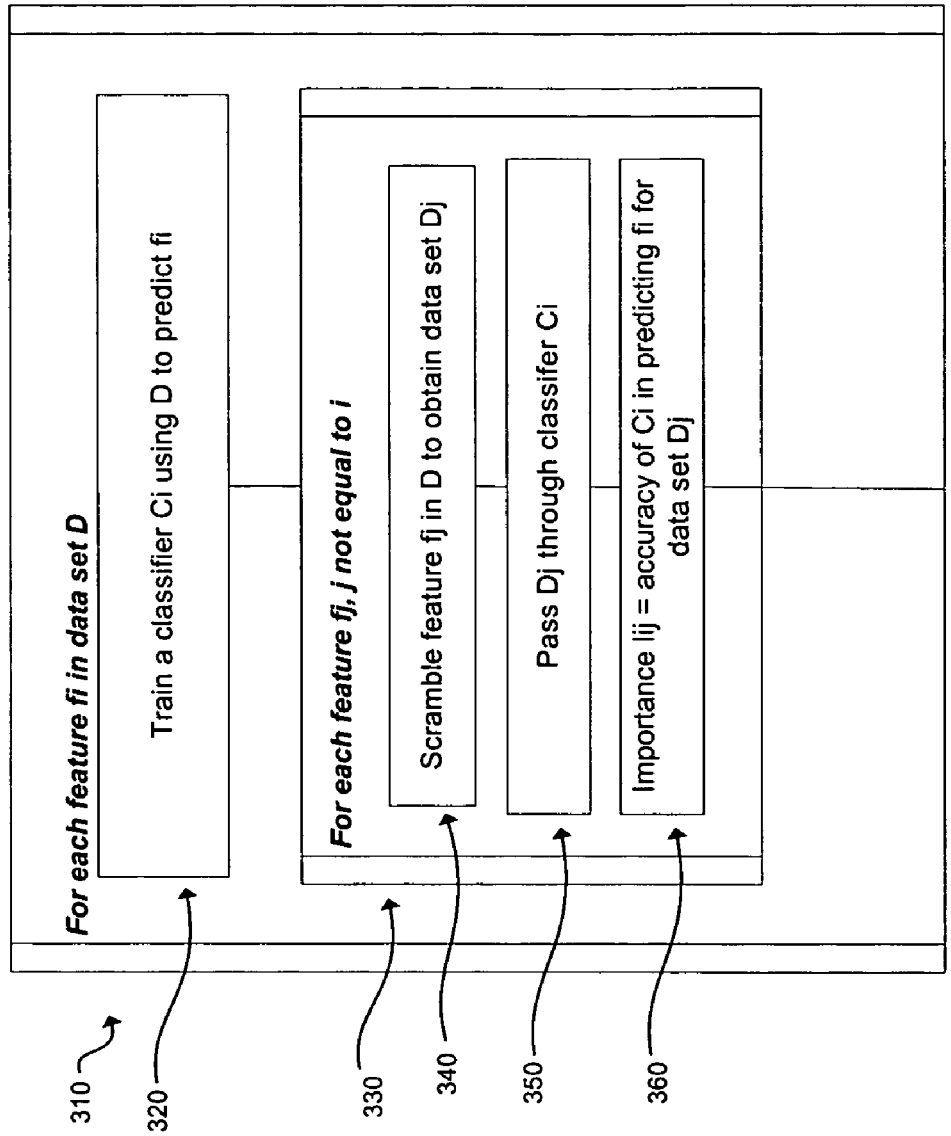
FIG. 3 depicts a processing to derive the importance of a feature in one embodiment.

The actual sequence of processing depicted in the pseudo code and in FIG. 3 is only one of a large number of variations in the sequence of actions that may be taken to derive the predictive importance value for a feature. Many other sequences of processing actions may yield the same or similar result in other embodiments.

Once a predictive importance metric such as the one obtained above is known, it may then be used in a variety of ways. In one embodiment, a graph of the features of interest in a dataset and the predictive importance relationship between them may be constructed as in FIG. 4. In the figure, nodes 410 are features and edges 420 represent a known predictive importance relationship derived in a manner similar to the processing described above and in FIG. 3. Thus, a directed edge between two feature nodes (fj,fi) would represent the predictive importance of feature j in predicting feature i. The nodes in this embodiment are labeled with a value, from 0 to 1 depending on the predictive importance metric derived for feature j in predicting feature i, as at 430 in the figure. Thus from the graph it is possible to deduce that efficiency is predicted by engine capacity with a relatively high predictive importance of 0.75; and that year is not predicted well by color, because the predictive importance of color in predicted year is a low 0.05. Such a graph may be termed a predictive importance network.

It should be noted that not all predictive relationships between features may be calculated or represented in a predictive importance network, and relationships of low interest may be omitted or not considered. The graph depicted in FIG. 4, for example, does not display a value for predictive importance of prediction of weight in terms of price or color in terms of efficiency. In other graphs derived from predictive importance values, all edges may be calculated. The completeness of the predictive importance network calculated may depend for one thing on the specific application of the predictive importance network or on computing time or efficiency for another, among many other potential factors as would be appreciated by one in the art.

Figure 4:
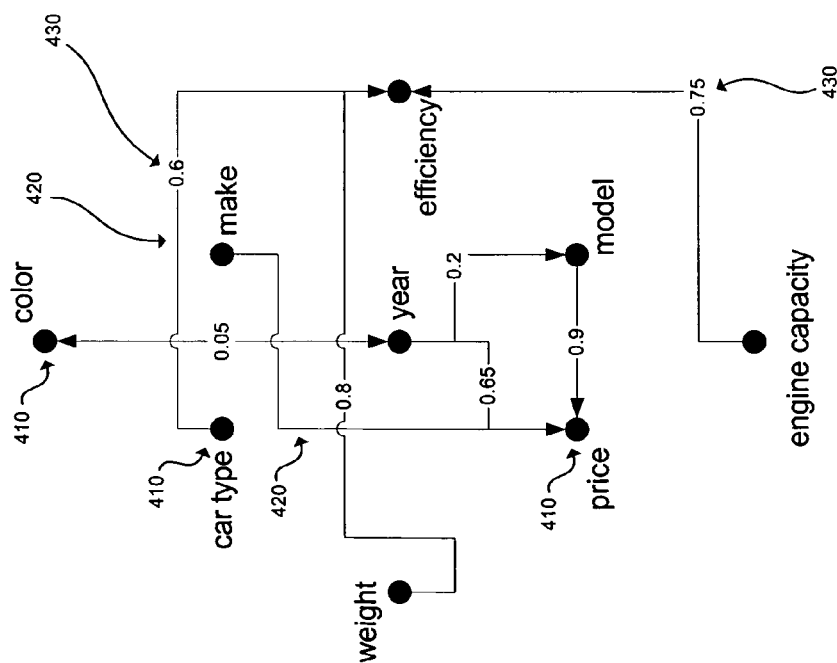
FIG. 4 depicts one visualization of an importance network in an embodiment.

A graph or a representation of a graph as in FIG. 4 may in some embodiments be used by a processor based system such as that of FIG. 1 described above to perform a variety of tasks. This includes among other things tasks that have may alternatively be performed by dependence networks. Among these tasks is data mining or data analysis, specifically, for one example, collaborative filtering which allows the features of a new data point to be predicted by a predictive importance network in a manner analogous to that used with dependence networks. Collaborative filtering has many applications, among which the prediction of future customer choices based on past customer purchases, or the discovery of trends in medical epidemic data are known in the art, A distinction between dependence networks and predictive importance networks in the context of their use as data analysis tools is that they may be more stable in regards to adding or subtracting data points to the data set from which the predictive importance network is derived than dependence networks. Many other applications of predictive importance networks are possible based on using a directed graph representation generally like the one in FIG. 4 in a processor based system.

Figure 5:
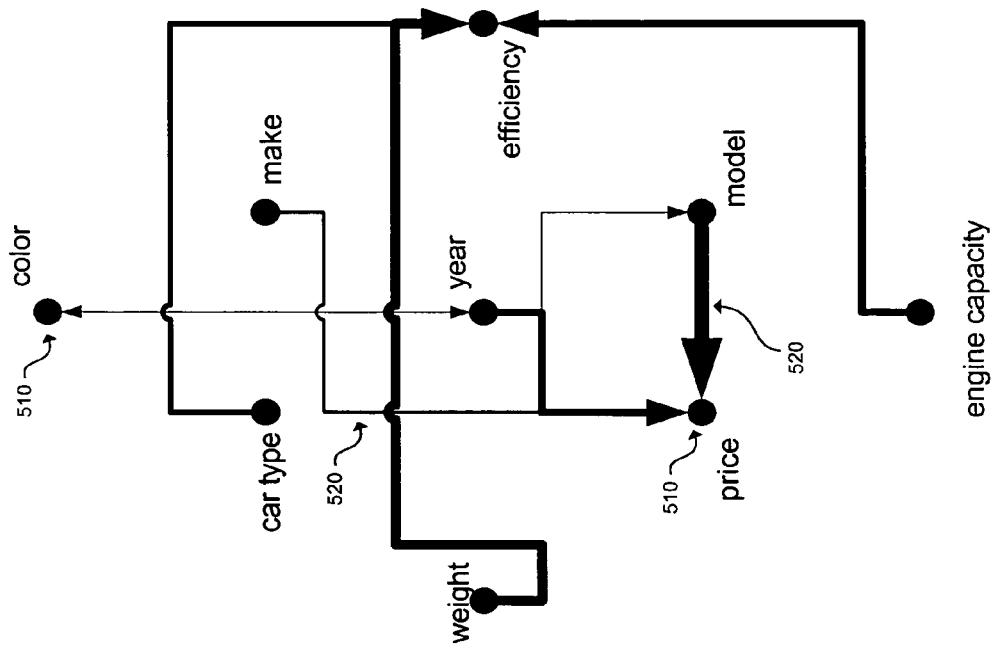
FIG. 5 depicts another visualization of an importance network in an embodiment.

In another embodiment a predictive importance network may be used in a processor based system as depicted in FIG. 1 with a peripheral display device such as a monitor or projector, or a peripheral printing device, to allow a human to visualize a set of parameters which are represented as features in a data set. FIG. 5 provides an illustrative example that represents the car data previously presented in FIG. 4 as a visualization, depicting similar predictive relationships between features represented as nodes 510, but with the predictive importance of the predictive relationships shown as varying thickness of the edges 520. Of course a practically unlimited set of possible visualizations of this data are possible using different types of layout, color, formats and more. Other types of visualization using three dimensional modeling or multimedia may also be used. Visualizations of predictive importance networks may be used for real time diagnosis of failure data in a manufacturing setting for one instance or for medical analysis of disease trends for another. Many other uses of a predictive importance network are possible.

It should also be noted that while the car data set has been used extensively in this application for clarity of exposition, it is only intended as a simple and familiar data set and should not limit the claims in any way. Predictive importance networks may be used with a wide variety of data including industrial manufacturing and medical data, marketing and sales forecasting data, and many others.

While certain exemplary embodiments have been described above and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. It is possible to implement the embodiments or some of their features in hardware, programmable devices, firmware, software or a combination thereof.

Embodiments may be provided as a computer program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below.

What is claimed is:

1. A computer-implemented method comprising:
generating predictive importance via an instance classification software and predictive importance network generator stored at a storage medium and executed by a processor coupled with the storage medium, the generating of the predictive importance including
for a first feature of a data set having a plurality of features, training a classifier to predict the first feature in terms of other features in the data set to obtain a trained classifier, wherein the data set is progressively classified into branches via a decision criterion such that the decision criterion is applied at each decision point, the decision criterion including functions of features, the features including the first feature and a second feature, wherein the classifier includes a forest based classifier;
scrambling the values of the second feature in the data set to obtain a scrambled data set, wherein scrambling including repeating the values of the second feature to be used for determining the predictive important of the second feature;
executing the trained classifier on the scrambled data set, wherein the trained classifier to facilitate distinguishing of content of the data set by relevancy of the content, wherein the relevancy is based on features contained in the data set;
determining the predictive importance of the second feature in predicting the first feature based at least in part on the accuracy of the trained classifier in predicting the first feature when executed with the scrambled data set, and based in part of other relevant features while ignoring other irrelevant features;
creating a graph of the data set in which each of the first and the second features is a node of the graph and a label on an edge between the first node and the second node is based at least in part on the predictive importance of the first feature in terms of the second feature;
applying the predictive importance to perform real-time diagnosis of factors including one or more of real-time medical analysis of a disease trend, real-time configuration of manufacturing settings to manufacture a product, and real-time safety analysis of a product; and
displaying, via a display device, the real-time diagnosis of the factors based on the predictive importance.

2. The method of claim 1 wherein the dataset comprises a plurality of data points, each data point having a value for each feature, and the accuracy of the trained classifier comprises the fraction that the number of data points in the scrambled data set for which the trained classifier correctly predicts the value of the first feature is of the total number of data points in the data set.

3. The method of claim 2 wherein scrambling the values of the second feature in the data set to obtain a scrambled data set further comprises randomly remapping the values of the feature from the data points of the original data set to the data points of the scrambled data.

4. The method of claim 3 wherein at least one of the features is a label.

5. The method of claim 3 wherein at least one of the features is a predictor.

6. The method of claim 3 wherein the classifier is a tree-based classifier.

7. The method of claim 3 wherein the classifier is a forest based classifier.

8. A computer system comprising:
a processor communicatively coupled to a storage device;
the storage device having stored thereon an instance classification software and predictive importance network generator when executed by a processor, causes the processor to generate predictive importance, the processor is further to:
for a first feature of a dataset having a plurality of features, train a classifier to predict the first feature in terms of other features in the data set to obtain a trained classifier, wherein the data set is progressively classified into branches via a decision criterion such that the decision criterion is applied at each decision point, the decision criterion including functions of features, the features including the first feature and a second feature, wherein the classifier includes a forest based classifier;
scramble the values of the second feature in the data set to obtain a scrambled data set, wherein scrambling including repeating the values of the second feature to be used for determining predictive important of the second feature, wherein the trained classifier is to facilitate distinguishing of content of the data set by relevancy of the content, wherein the relevancy is based on features contained in the data set;

execute the trained classifier on the scrambled data set;

determine the predictive importance of the second feature in predicting the first feature based at least in part on the accuracy of the trained classifier in predicting the first feature when executed with the scrambled data set, and based in part of other relevant features while ignoring other irrelevant features;

create a graph of the data set in which each of the first and the second features is a node of the graph and a label on an edge between the first node and the second node is based at least in part on the predictive importance of the first feature in terms of the second feature;

apply the predictive importance to perform real-time diagnosis of factors including one or more of real-time medical analysis of a disease trend, real-time configuration of manufacturing settings to manufacture a product, and real-time safety analysis of a product; and display, via a display device, the real-time diagnosis of the factors based on the predictive importance.

9. The system of claim 8 wherein the dataset comprises a plurality of data points, each data point having a value for each feature, and the accuracy of the trained classifier comprises the fraction that the number of data points in the scrambled data set for which the trained classifier correctly predicts the value of the first feature is of the total number of data points in the data set.

10. The system of claim 9 wherein scrambling the values of the second feature in the data set to obtain a scrambled data set further comprises randomly remapping the values of the feature from the data points of the original data set to the data points of the scrambled data.

11. A machine readable medium comprising instructions which, when executed, causes a machine to:

generate predictive importance via an instance classification software and predictive importance network generator stored at a storage medium and executed by a processor coupled with the storage medium, wherein the instructions which when executed to generate the predictive importance, further cause the machine to for a first feature of a dataset having a plurality of features, train a classifier to predict the first feature in terms of other features in the data set to obtain a trained classifier, wherein the data set is progressively classified into branches via a decision criterion such that the decision criterion is applied at each decision point, the decision criterion including functions of features, the features including the first feature and a second feature, wherein the classifier includes a forest based classifier;

scramble the values of the second feature in the data set to obtain a scrambled data set, wherein scrambling including repeating the values of the second feature to be used for determining the predictive important of the second feature, wherein the trained classifier to facilitate distinguishing of content of the data set by relevancy of the content, wherein the relevancy is based on features contained in the data set;

execute the trained classifier on the scrambled data set; and determine the predictive importance of the second feature in predicting the first feature based at least in part on the accuracy of the trained classifier in predicting the first feature when executed with the scrambled data set, and based in part of other relevant features while ignoring other irrelevant features;

create a graph of the data set in which each of the first and the second features is a node of the graph and a label on an edge between the first node and the second node is based at least in part on the predictive importance of the first feature in terms of the second feature;

applying the predictive importance to perform real-time diagnosis of factors including one or more of real-time medical analysis of a disease trend, real-time configuration of manufacturing settings to manufacture a product, and real-time safety analysis of a product; and displaying, via a display device, the real-time diagnosis of the factors based on the predictive importance.

12. The machine readable medium of claim 11 wherein the dataset comprises a plurality of data points, each data point having a value for each feature, and the accuracy of the trained classifier comprises the fraction that the number of data points in the scrambled data set for which the trained classifier correctly predicts the value of the first feature is of the total number of data points in the data set.

13. The machine readable medium of claim 12 wherein scrambling the values of the second feature in the data set to obtain a scrambled data set further comprises randomly remapping the values of the feature from the data points of the original data set to the data points of the scrambled data.

14. The machine readable medium of claim 13 wherein at least one of the features is a label.

15. The machine readable medium of claim 13 wherein at least one of the features is a predictor.

16. The machine readable medium of claim 13 wherein the classifier is a tree-based classifier.

17. The machine readable medium of claim 13 wherein the classifier is a forest-based classifier.

* * * * *